United States Patent Office 3,144,388
Patented Aug. 11, 1964

3,144,388
ANALGETIC COMPOSITIONS CONTAINING TETRAHYDROPYRIDINES
Hans Herbert Kühnis and Rolf Denss, Basel, and Conrad Hans Eugster, Wallisellen, Switzerland, assignors to Geigy Chemical Corporation, Ardsley, N.Y., a corporation of Delaware
No Drawing. Filed June 21, 1962, Ser. No. 204,080
Claims priority, application Switzerland June 22, 1961
9 Claims. (Cl. 167—65)

The present invention concerns novel compositions containing as essential ingredients tetrahydropyridine derivatives, which compositions have valuable pharmacological properties, as well as methods for the use of these compositions in mammals.

It has surprisingly been found that compositions containing tetrahydropyridine derivatives of the formula

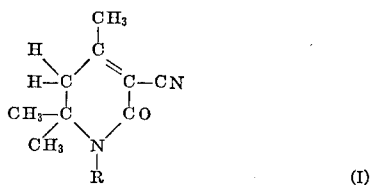

(I)

wherein R is n-propyl, benzyl or allyl, have an excellent sedative, analgetic, antiphlogistic and antipyretic action and also an excellent depressant action on the central nervous system when administered parenterally and also per os. They are particularly useful in relieving coughing.

The compounds of Formula I can be produced in a simple manner by condensing a compound of the formula

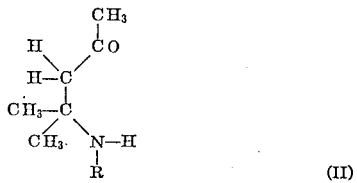

(II)

in which R has the above meaning, with cyanoacetic acid chloride or bromide. The condensation generally occurs smoothly at room temperature or even below it. For example, the reaction components are treated with an acid binding agent, e.g. with a tertiary organic base such as triethylamine, preferably in a suitable inert organic solvent such as e.g. diethyl ether, dioxan or tetrahydrofuran.

Starting materials of Formula II are obtained, for example, by adding suitable primary amines of the formula

H$_2$N—R (III)

wherein R has the meaning given above, namely either n-propylamine, or benzylamine, or allylamine, to mesityl oxide, an α,β-unsaturated oxo compound.

The novel compositions according to the invention, in which the compounds of the Formula I are present as essential ingredients in amounts of at least 0.5% by weight, and preferably 1% to 80%, are suitable, in particular, for the treatment of rheumatic conditions, as well as for the removal or relief of pain due to various causes and for the treatment of conditions of psychic excitement and tension, as well as in relieving coughing.

To produce dosage units for peroral administration, the active substances above mentioned are combined with pharmaceutically acceptable, non-toxic carriers, e.g. with solid pulverulent carriers such as talcum, lactose, saccharose, sorbitol, mannitol, starches such as potato starch, corn starch or amylopectin, cellulose derivatives or gelatines, possibly with the addition of lubricants such as magnesium or calcium stearate or polyethylene oxides of suitable molecular weights (Carbowax) and disintegrating agents such as e.g. alginic acid, laminaria powder or powdered lemon pulp, to form tablets or centers for sugar-coated tablets (dragées). The latter are coated, for example, with concentrated sugar solutions which can also contain e.g. shellac, gum arabic, talcum and/or titanium dioxide. Dyestuffs are added to the dragées, e.g. to differentiate between the various contents of active substance. Such tablets contain preferably between about 50 mg. and about 750 mg. of the tetrahydropyridine derivatives of Formula I, and the content of the said dragées is preferably between about 25 mg. and about 200 of the active agent, said amounts constituting about 30 to 80% of the total weight of the tablets or dragées. Soft gelatin capsules (pearl-shaped closed capsules) and other closed capsules consist e.g. of gelatin and contain, for example, mixtures of the active substance with Carbowax, and hard gelatin capsules contain, for example, granulates of a compound of the Formula I with gelatin, magnesium stearate or stearic acid. Suppositories are examples of dosage units for rectal administration; they consist of combinations of compounds of the Formula I with a neutral fatty basis. These suppositories contain preferably between about 100 mg. and about 400 mg. of the tetrahydropyridine derivatives of the Formula I, which represents about 10% to 30% of the total weight of the suppositories.

To produce compositions for parenteral, e.g. intravenous or intramuscular, application compounds of the Formula I are dissolved in water, if necessary with the addition of a suitable solubility promoter such as sodium benzoate and/or propylene glycol. Depending on the type of treatment desired, also substances having themselves antiphlogistic and/or analgetic activity can be used as solubility promoters, for instance salicylic acid, acetyl salicylic acid, sodium salicylate, 1,2-diphenyl-4-n-butyl-3,5-dioxopyrazolidine, 1-(p-hydroxyphenyl)-2-phenyl-4-n-butyl-3,5-dioxopyrazolidine or the sodium salts thereof.

These compositions with two active ingredients surprisingly show less sodium ion retention in the organism of mammals than the individual compounds salicylic acid, acetylsalicylic acid, 1,2-diphenyl-4-n-butyl-3,5-dioxoprazolidine and 1-(p-hydroxyphenyl)-2-phenyl-4-n-butyl-3,5-dioxo-pyrazolidine, respectively. It has further surprisingly been found, that the analgetic activity of the compounds of Formula I is potentiated and the time of activity is regulated, when these compounds are administered in the form of said multi-active compositions.

Also emulsions of compounds of the Formula I are suitable for parenteral application; these contain e.g. carboxymethylcellulose preparations as emulsifying agents, and the active agent content lies preferably between about 1% and about 5% of the total weight of the emulsion.

The following non-limitative examples further illustrate the invention. Parts are given therein as parts by weight unless stated otherwise; their relationship to parts by volume is as that of grams to cubic centimeters. The temperatures are given in degrees centigrade.

EXAMPLE 1

(a) 51 parts by volume of allylamine are added to 77 parts by volume of mesityl oxide and the whole is left to stand for 15 to 30 minutes. The mixture is then dissolved in 2 N-hydrochloric acid while cooling and the resulting solution is extracted twice with ether. The acid solution is then made alkaline with concentrated aqueous sodium hydroxide solution while cooling, the amine which separates is extracted with ether and the ethereal solution is concentrated at room temperature under reduced pressure. The crude 4-allylamino-4-methylpentan-2-one which remains as an oil is further reacted directly in the following step.

(b) 94 parts of the above crude product are dissolved in 820 parts by volume of anhydrous ether, and 306 parts by volume of triethylamine are added to the solution. A solution of 63.5 parts of cyanoacetic acid chloride in 635 parts by volume of anhydrous ether is added dropwise at a temperature of about −10° to −20° while stirring and the mixture is stirred for 90 to 120 minutes at the above temperature. Triethylamine hydrochloride, which contains considerable amounts of crude 1-allyl-3-cyano-4,6,6-trimethyl-5,6-dihydro-pyridone-(2), is then filtered off and the filtrate is concentrated in vacuo. The mixture which was filtered off is then dissolved in water, the insoluble substance is filtered off, dissolved in chloroform and the solution is washed with water, dried and concentrated. Both concentrates which consist of crude 1-allyl-3 - cyano - 4,6,6 - trimethyl - 5,6 - dihydro - pyridone - (2) are combined and recrystallized from acetone/water. M.P. 113°.

EXAMPLE 2

(a) 9.8 parts of 2-methyl-2-penten-4-one are stirred for 30 minutes at room temperature with 10.7 parts of benzylamine. 2 N-hydrochloric acid is then added in excess above the amount required for the neutralization of the reaction mass, while cooling well and the whole is extracted with ether. The acid solution is then made alkaline with concentrated aqueous sodium hydroxide solution and the base which precipitates is extracted with ether. The ether is distilled off at 20° under reduced pressure and the oil which remains is further used in the crude state, as described below.

(b) 30.5 parts of the above crude product are dissolved in 300 parts by volume of anhydrous ether and 73 parts by volume of triethylamine are added. 15.1 parts of cyanoacetic acid chloride in 150 parts by volume of anhydrous ether are then added dropwise within 5 minutes at a temperature of about −15° to −25° while stirring strongly and the mixture is stirred for another 2 hours at a temperature of about −10° to −30°. The reaction mixture is filtered and the filtrate is concentrated whereupon the 1-benzyl-3-cyano-4,6,6-trimethyl-5,6-dihydro-pyridone-(2) crystallizes.

After recrystallization from acetone/ether, it melts at 146–148°. A further amount of this compound is obtained if the triethylamine hydrochloride obtained as filter residue, which still contains 1-benzyl-3-cyano-4,6,6-trimethyl-5,6-dihydro-pyridone-(2), is dissolved in water, the insoluble substance is extracted with chloroform and the solution is washed with water, dried and concentrated.

The following compound is produced in an analogous manner: 1 - propyl - 3 - cyano - 4,6,6 - trimethyl - 5,6-dihydro-pyridone-(2), M. P. 108–110°.

EXAMPLE 3

The compounds produced as described in Examples 1 and 2 were tested for analgesic activity, according to the method of F. Gross, Helv. Physiol. et Pharmacol. Acta 5, C–31 (1947) in the modification published by Hotovy, Arzneimittelforschung 4, 282 (1954). The rays of an electric lamp were collected by a concave mirror and the focus was directed onto the tail roots of mice. For each test, 10 to 20 mice weighing from about 18 to about 25 g. were used.

The reaction time, i.e. the time lag from the beginning of the application of the irritating rays until the animal reacts by drawing back its tail, was determined before the administration of the compounds to be tested. Then the substance was administered to the mice perorally in doses given below. The determination of the reaction time was made after 15, 30, 45, 60, 90 and 120 minutes. The reaction time measured before the administration of the compounds was considered as the irritating threshold, and the variation of the irritating threshold (reaction time) after the administration of the compounds is given in percent (%) in the table below. In order to express the activity of each substance by one single figure, the average variation of the irritation thresholds of all animals tested with that substance was calculated.

RESULTS

Table

| | Average modification of the irritation threshold in percent | Dosage, mg./kg. orally |
|---|---|---|
| 1-allyl-3-cyano-4,6,6-trimethyl-5,6-dihydro-pyridone-(2). | +16 | 50 |
| | +62 | 100 |
| | +113 | 200 |
| 1-benzyl-3-cyano-4,6,6-trimethyl-5,6-dihydro-pyridone-(2). | +16 | 400 |
| | (+79 after 120 minutes) | |
| 1-propyl-3-cyano-4,6,6-trimethyl-5,6-dihydro-pyridone-(2). | +19 | 50 |
| | +61 | 100 |

Comparative tests were carried out with the well known analgesic acetylsalicylic acid, which showed, when administered orally in a dosage of 300 mg./kg., an average modification of the irritation threshold of +4%, and in a dosage of 500 mg./kg., an average modification of +17%.

EXAMPLE 4

1000 tablets each containing 500 mg. of active substance of Formula I are obtained by mixing intimately three components A, B and C in the following proportions:

(A)

| | Grams (g.) |
|---|---|
| Active substance of Formula I | 500.0 |
| Potato starch | 59.5–176.5 |
| Lactose | 59.5–176.5 |
| Aerosil, uncompressed | 25.5–59.5 |

(B)

| | |
|---|---|
| Polyvinylpyrrolidone | 25.5–51.0 |
| Glycerine, Ph. Helv. V | 8.5–34.0 |
| Distilled water, q.s. | |

(C)

| | |
|---|---|
| Potato starch | 42.5–85.0 |
| Talcum | 42.5–85.0 |
| Aerosil, uncompressed | 4.25–8.5 |
| Magnesium stearate | 2.5–4.25 |
| The total weight must be | 850.0 |

To produce the powder mixture (A), first the uncompressed aerosil is mixed with the dried potato starch. The active substance is then added, the whole is mixed and then passed through a sieve (e.g. sieve V, Pharm. Helv. V). Finally, the lactose is added and the powder mixture (A) is passed through a sieve. This powder mixture is then evenly moistened with the granulating solution (B) and the mass is granulated through a sieve (e.g. sieve IV, Pharm. Helv. V). It is dried at about 30° for about 16 hours. The dried granulate is again passed through a sieve and then carefully mixed with the mixture of substances given under (C). The mass so prepared is then compressed into tablets each weighing 850 mg. and containing 500 mg. of active substance.

In a specific case, the following proportions were used:

(A)

| | Grams (g.) |
|---|---|
| 1 - allyl - 3 - cyano - 4,6,6 - trimethyl - 5,6 - dihydro-pyridone-(2) | 500.0 |
| Potato starch | 95.5 |
| Lactose | 63.5 |
| Aerosil, uncompressed | 34.0 |

(B)

| | |
|---|---|
| Polyvinylpyrrolidone | 25.5 |
| Glycerine, Ph. Helv. V | 34.0 |
| Distilled water, q.s. | |

(C)

| | |
|---|---|
| Potato starch | 42.5 |
| Talcum | 42.5 |
| Aerosil, uncompressed | 8.5 |
| Magnesium stearate | 4.0 |
| | 850.0 |

In an analogous manner, tablets containing 500 mg. of the active compounds and weighing in total 850 mg. can be prepared starting with 500.0 g. 1-n-propyl-3-cyano-4,6,6-trimethyl-5,6-dihydro-pyridone-(2) and with 500.0 g. 1 - benzyl - 3 - cyano - 4,6,6 - trimethyl - 5,6 - dihydro-pyridone-(2), respectively.

EXAMPLE 5

In order to produce 1000 dragées each containing 100 mg. of active substance of Formula I the following components are mixed intimately with each other:

(A)

| | Grams (g.) |
|---|---|
| Active substance | 100.0 |
| Potato starch | 16.0–70.0 |
| Lactose | 10.0–20.0 |

(B)

| | |
|---|---|
| Polyvinylpyrrolidone | 6.0–10.0 |
| Glycerine | 2.0–8.0 |
| Aerosil, uncompressed | 1.0–1.8 |
| Distilled water, q.s. | |

(C)

| | |
|---|---|
| Potato starch | 8.0–16.0 |
| Talcum | 8.0–16.0 |
| Magnesium stearate | 0.6–1.0 |
| The total weight must be | 200.0 |

The components (A) are thoroughly mixed and sieved, then evenly moistened with the granulating solution (B) and granulated. This granulate is dried, again sieved and then carefully mixed with the compounds (C). From this mixture the cores are compressed, each core weighing 200 mg. and containing 100 mg. of the active substance of Formula I.

The dragées are then finished with coating solutions in the usual way. In this manner, dragées having a total (i.e. core and coating) weight of e.g. 305 mg. and containing 100 mg. of active substance of Formula I are obtained.

In a specific case the following proportions were used:

(A)

| | Grams (g.) |
|---|---|
| 1 - n - propyl - 3 - cyano - 4,6,6 - trimethyl - 5,6-dihydro-pyridone-(2) | 100.0 |
| Potato starch | 51.0 |
| Lactose | 12.6 |

(B)

| | |
|---|---|
| Polyvinylpyrrolidone | 6.0 |
| Glycerine | 8.0 |
| Aerosil, uncompressed | 1.4 |
| Ethanol | — |

(C)

| | |
|---|---|
| Potato starch | 8.0 |
| Talcum | 12.0 |
| Magnesium stearate | 1.0 |
| | 200.0 |

The cores prepared from these compounds are coated to form dragées, with a coating solution prepared from the following ingredients:

| | G. |
|---|---|
| Lacca (shellac) | 3.00 |
| Gum arabic | 9.00 |
| Dyestuff | 0.03 |
| Talcum | 19.20 |
| Aerosil | 1.50 |
| Sugar | 72.27 |
| | 105.00 |

In Examples 4 and 5, the following compounds may be used alternatively: corn starch instead of potato starch, gelatin or sodium carboxyethylcellulose instead of polyvinylpyrrolidone, sorbitol 70% instead of glycerine.

In an analogous manner, dragées each containing 100 mg. of the active compound and each weighing 200 mg. can be prepared from 100.0 g. of 1-benzyl-3-cyano-4,6,6-trimethyl-5,6-dihydro-pyridone-(2) and 100.0 g. of 1-allyl - 3 - cyano - 4,6,6 - trimethyl - 5,6 - dihydro - pyridone-(2), respectively.

EXAMPLE 6

In order to produce 1000 dragées each containing 50 mg. of active substance of Formula I and 50 mg. of 1,2-diphenyl-4-n-butyl-3,5-dioxo-pyrazolidine, the following components are mixed intimately with each other:

(A)

| | Grams (g.) |
|---|---|
| Active substance of Formula I | 25.0–75.0 |
| 1,2-diphenyl-4-n-butyl-3,5-dioxopyrazolidine | 75.0–25.0 |
| Potato starch | 16.0–70.0 |
| Lactose | 10.0–20.0 |

(B)

| | |
|---|---|
| Polyvinylpyrrolidone | 6.0–10.0 |
| Glycerine | 2.0–8.0 |
| Aerosil, uncompressed | 1.0–1.8 |
| Distilled water, q.s. | |

(C)

| | |
|---|---|
| Potato starch | 8.0–16.0 |
| Talcum | 8.0–16.0 |
| Magnesium stearate | 0.6–1.0 |
| The total weight must be | 200.0 |

Dragées are formed in an analogous manner as described in Example 5.

In a specific case, the following proportions were used:

(A)

| | Grams (g.) |
|---|---|
| 1 - propyl - 3 - cyano - 4,6,6 - trimethyl - 5,6 - dihydro-pyridone-(2) | 50.0 |
| 1,2 - diphenyl - 4 - n - butyl - 3,5 - dioxopyrazolidine | 50.0 |
| Potato starch | 51.0 |
| Lactose | 12.6 |

(B)

| | |
|---|---|
| Polyvinylpyrrolidone | 6.0 |
| Glycerine | 8.0 |
| Aerosil, uncompressed | 1.4 |
| Distilled water | — |

(C)

| | |
|---|---|
| Potato starch | 8.0 |
| Talcum | 12.0 |
| Magnesium stearate | 1.0 |
| | 200.0 |

EXAMPLE 7

Prescriptions for syrup suspensions:

(a)

| | Grams (g.) |
|---|---|
| 1 - allyl - 3 - cyano - 4,6,6 - trimethyl - 5,6 - dihydro-pyridone-(2), finely ground | 2.00 |
| Aerosil, uncompressed | 2.00 |
| Carboxymethylcellulose, highly viscous | 0.50 |
| Methyl p-hydroxybenzoate | 0.42 |
| Propyl p-hydroxybenzoate | 0.18 |
| Aromaticum, q.s. | |
| Granulated sugar | 35.00 |
| Distilled water, ad. 100.00 ml. | |

(b)

| | |
|---|---|
| 1 - n - propyl - 3 - cyano - 4,6,6 - trimethyl - 5,6-dihydro-pyridone-(2), finely ground | 2.00 |
| Aerosil, uncompressed | 2.00 |
| Tragacanth | 0.30–0.50 |
| Sorbic acid | 0.10 |
| Aromaticum, q.s. | |
| Glycerol | 10.00 |
| Granulated sugar | 30.00 |
| Distilled water, ad. 100.00 ml. | |

(c)

| | |
|---|---|
| 1 - benzyl - 3 - cyano - 4,6,6 - trimethyl - 5,6 - dihydro-pyridone-(2), finely ground | 2.00 |
| Aerosil, uncompressed | 2.00 |
| Methylcellulose | 0.70 |
| Sorbic acid | 0.10 |
| Aromaticum, q.s. | |
| Sorbitol (70%), ad. 100.00 ml. | |

EXAMPLE 8

For the preparation of suppositories, each containing 250 mg. of the active substance of Formula I and each weighing 1.7 g., the following components are intimately mixed with each other:

(a)

| | Kg. |
|---|---|
| 1 - allyl - 3 - cyano - 4,6,6 - trimethyl - 5,6- dihydro-pyridone-(2), finely ground | 2.500 |
| Massa Estarinum 924 (mixture of fatty acid glycerides, largely triglyceride of stearic acid) | 14.500 |
| | 17.000 |

From this mass 10,000 suppositories are prepared in the usual manner.

(b)

| | Kg. |
|---|---|
| 1 - n - propyl - 3 - cyano - 4,6,6 - trimethyl - 5,6-dihydro-pyridone-(2), finely ground | 2.500 |
| Aerosil, uncompressed | 0.500 |
| Massa Estarinum 924 | 14.000 |
| | 17.000 |

(c)

| | |
|---|---|
| 1 - benzyl - 3 - cyano - 4,6,6 - trimethyl - 5,6 - dihydro-pyridone-(2), finely ground | 2.500 |
| Wool fat, Ph. Helv. V | 0.100 |
| Witepsol "G" (mixture of glycerides of fatty acids) | 14.400 |
| | 17.000 |

From the masses described under (b) and (c), 10,000 suppositories are prepared in the usual manner, each weighing 1.7 g. and containing 250 mg. of the active substance.

What is claimed is:

1. A composition consisting essentially of:
   (a) from about 1% to about 80% of a compound of the formula

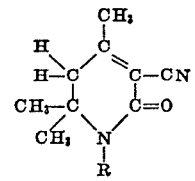

wherein R is a member selected from the group consisting of n-propyl, benzyl and allyl, and
   (b) a member selected from the group consisting of salicylic acid, acetylsalicylic acid, 1,2-diphenyl-4-n-butyl-3,5-dioxopyrazolidine, 1-(p-hydroxy-phenyl)-2-phenyl-4-n-butyl 3,5-dioxopyrazolidine and the sodium salts thereof.

2. A composition comprising as active agent not less than 0.5% by weight of a compound of the formula

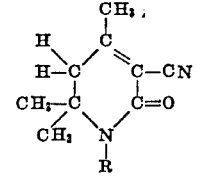

wherein R is a member selected from the group consisting of n-propyl, benzyl and allyl, and a significant amount of pharmaceutically acceptable carrier.

3. A composition comprising as active agent between about 1% and about 80% by weight of a compound of the formula

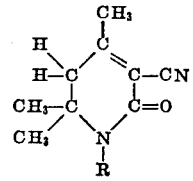

wherein R is a member selected from the group consisting of n-propyl, benzyl and allyl, and a significant amount of pharmaceutically acceptable carrier.

4. A composition in tablet dosage unit form comprising as active agent between about 50 mg. and about 750 mg. of a compound of the formula

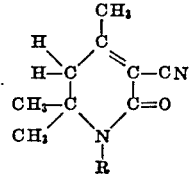

wherein R is a member selected from the group consisting of n-propyl, benzyl and allyl, per dosage unit, and pharmaceutically acceptable carrier.

5. A composition in dragée dosage unit form comprising as active agent between about 25 mg. and about 200 mg. of a compound of the formula

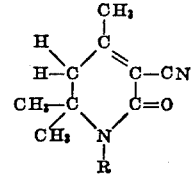

wherein R is a member selected from the group consisting of n-propyl, benzyl and allyl, per dosage unit, and pharmaceutically acceptable carrier.

6. A composition in suppositories dosage unit form comprising as active agent between about 100 mg. and about 400 mg. of a compound of the formula

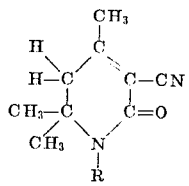

wherein R is a member selected from the group consisting of n-propyl, benzyl and allyl, per dosage unit, and pharmaceutically acceptable carrier.

7. A liquid pharmaceutical composition, suitable for administration to mammals comprising as active agent not less than 0.5% of a compound of the formula

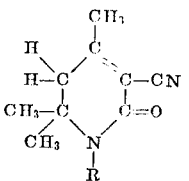

wherein R is a member selected from the group consisting of n-propyl, benzyl and allyl, in a liquid pharmaceutically acceptable solvent, together with pharmaceutically acceptable carrier.

8. A method for the removal of pain in mammals which comprises administering an effective amount of a compound of the formula

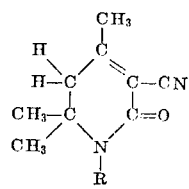

wherein R is a member selected from the group consisting of n-propyl, benzyl and allyl, to said mammals.

9. A method for the removal of pain in mammals which comprises administering to said mammals a pharmaceutical composition containing an effective amount of a compound of the formula

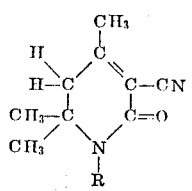

wherein R is a member selected from the group consisting of n-propyl, benzyl and allyl.

No references cited.